US011341988B1

(12) United States Patent
Pishehvar et al.

(10) Patent No.: US 11,341,988 B1
(45) Date of Patent: May 24, 2022

(54) HYBRID LEARNING-BASED AND STATISTICAL PROCESSING TECHNIQUES FOR VOICE ACTIVITY DETECTION

(71) Applicant: Apple Inc., Cupertino, CA (US)

(72) Inventors: Ramin Pishehvar, Los Angeles, CA (US); Feiping Li, Santa Clara, CA (US); Ante Jukic, Los Angeles, CA (US); Mehrez Souden, Los Angeles, CA (US); Joshua D. Atkins, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 108 days.

(21) Appl. No.: 16/578,802

(22) Filed: Sep. 23, 2019

(51) Int. Cl.
*G10L 15/22* (2006.01)
*G10L 25/84* (2013.01)
*G10L 15/05* (2013.01)

(52) U.S. Cl.
CPC .............. *G10L 25/84* (2013.01); *G10L 15/05* (2013.01); *G10L 15/22* (2013.01)

(58) Field of Classification Search
CPC ..... G10L 15/16; G10L 25/30; G10L 21/0232; G10L 15/04; G10L 15/20; G10L 15/22; G10L 2015/223; G10L 2021/02082; G10L 21/0364; G10L 25/78; G10L 25/84; G10L 25/87; G10L 13/00; G10L 15/02; G10L 15/05; G10L 15/08; G10L 15/10; G10L 15/1815; G10L 15/19; G10L 15/30; G10L 17/02; G10L 17/04; G10L 17/18; G10L 17/22; G10L 19/00; G10L 2015/088; G10L 21/003; G10L 21/0208; G10L 21/0316;
(Continued)

(56) References Cited

U.S. PATENT DOCUMENTS 9,672,811 B2 * 6/2017 Kalinli-Akbacak .... G10L 25/03
9,824,684 B2 * 11/2017 Yu ........................... G10L 15/16
(Continued)

OTHER PUBLICATIONS

Chang, Qhuo-Yiin, et al., "Endpoint Detection using Grid Long Short-Term Memory Networks for Streaming Speech Recognition", Interspeech 2017, Aug. 20, 2017, pp. 3812-3816.
(Continued)

*Primary Examiner* — Vijay B Chawan
(74) *Attorney, Agent, or Firm* — Womble Bond Dickinson (US) LLP

(57) ABSTRACT

A hybrid machine learning-based and DSP statistical post-processing technique is disclosed for voice activity detection. The hybrid technique may use a DNN model with a small context window to estimate the probability of speech by frames. The DSP statistical post-processing stage operates on the frame-based speech probabilities from the DNN model to smooth the probabilities and to reduce transitions between speech and non-speech states. The hybrid technique may estimate the soft decision on detected speech in each frame based on the smoothed probabilities, generate a hard decision using a threshold, detect a complete utterance that may include brief pauses, and estimate the end point of the utterance. The hybrid voice activity detection technique may incorporate a target directional probability estimator to estimate the direction of the speech source. The DSP statistical post-processing module may use the direction of the speech source to inform the estimates of the voice activity.

20 Claims, 6 Drawing Sheets

(58) Field of Classification Search
CPC ......... G10L 25/03; G10L 25/15; G10L 25/63; G06N 3/0454; G06N 3/08; H04N 7/04; H04N 7/147; H04N 7/15
USPC ................ 704/240, 243, 250, 202, 259, 232
See application file for complete search history.

(56) References Cited

U.S. PATENT DOCUMENTS

| | | | | |
|---|---|---|---|---|
| 9,978,374 | B2* | 5/2018 | Heigold | G10L 17/18 |
| 10,672,414 | B2* | 6/2020 | Tashev | G06N 3/08 |
| 10,904,485 | B1* | 1/2021 | Childress, Jr. | G06K 9/00228 |
| 2016/0358602 | A1* | 12/2016 | Krishnaswamy | G10L 15/20 |
| 2018/0040333 | A1* | 2/2018 | Wung | G10L 21/0232 |
| 2018/0366138 | A1* | 12/2018 | Ramprashad | G10L 21/0208 |
| 2019/0318755 | A1* | 10/2019 | Tashev | G10L 25/84 |
| 2019/0318759 | A1* | 10/2019 | Doshi | G10L 15/05 |
| 2019/0385608 | A1* | 12/2019 | Lee | G10L 25/78 |

OTHER PUBLICATIONS

Gelly, Gregory, et al., "Optimization of RNN-Based Speech Activity Detection", IEEE/ACM Transactions on Audio, Speech, and Language Processing, vol. 26, No. 3, Mar. 2018, pp. 646-656.

Hughes, Thad, et al., Recurrent Neural Networks for Voice Activity Detection:, ICASSP 2013, 2013, pp. 7378-7382.

Nemer, Elias, et al., "Robust Voice Activity Detection Using Higher-Order Statistics in the LPC Residual Domain", IEEE Transactions on Speech and Audio Processing, vol. 9, No. 3, Mar. 2001, pp. 217-231.

Ramirez, J., et al., "Voice Activity Detection with Noise Reduction and Long-Term Spectral Divergence Estimation", ICASSP 2004, 2004, pp. 1093-1096.

Sehgal, Abhishek, et al., "A Convolutional Neural Network Smartphone App for Real-Time Voice Activity Detection", IEEE Access, Mar. 13, 2018, vol. 6, pp. 9017-9026.

Sohn, Jongseo, et al., "A Statistical Model-Based Voice Activity Detection", IEEE Signal Processing Letters, vol. 6, No. 1, Jan. 1999, pp. 1-3.

* cited by examiner

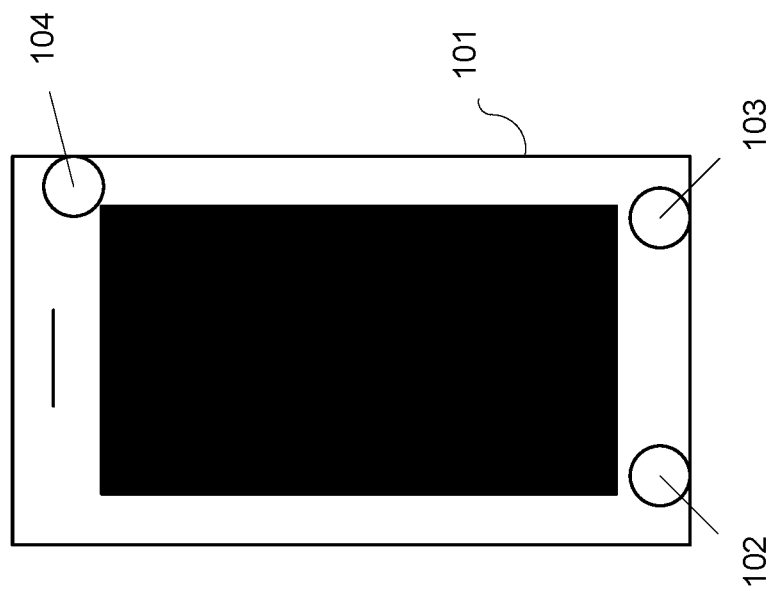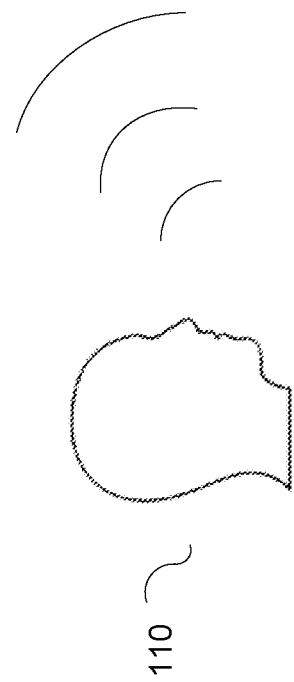
FIG. 1

HYBRID LEARNING-BASED AND STATISTICAL PROCESSING TECHNIQUES FOR VOICE ACTIVITY DETECTION

FIELD

This disclosure relates to the field of audio communication devices; and more specifically, to digital signal processing methods designed to detect the presence of speech such as voice commands issued by speakers to the audio communication devices. Other aspects are also described.

BACKGROUND

Consumer electronic devices such as smartphones, desktop computers, laptops, home assistant devices, etc., are voice controlled digital devices that may be controlled by users issuing speech commands to the devices. For example, users may issue voice commands to the devices to make phone calls, send messages, play media content, obtain query responses, get news, setup reminders, etc. A voice command issued by a speaker may be interfered by voice from a competing speaker, noise, or the main speaker's own interruptions. For the devices to invoke applications and services to respond accurately and timely to the voice commands, the devices may detect and recognize the voice commands in the noisy environment.

SUMMARY

A user may issue voice commands to smartphones, smart assistant devices, smartwatches, or other electronic or media playback devices. A device may process audio signals from one or more microphones of the device to detect the voice commands to enable automatic speech recognition (ASR) in an online or offline environment. Voice activity detection may arise in applications such as end pointing, speech routing, voice prominence detection, speech level estimation, speech context detection, etc. For example, voice activity detection may estimate the end of a query from a speaker, referred to as end pointing, to allow the ASR to process the complete query to recognize and interpret the query. In another example, voice activity detection may estimate the prominence (e.g., level, duty cycle) of speech from a speaker to dynamically route the speech among multiple speakers in video conferencing applications. The devices may receive the voice commands in a noisy environment of background noise, competing speakers, reverberant signals, etc. Robust voice activity detection in the noisy environment enables the devices to accurately and rapidly respond to the voice commands.

Voice activity detection may use purely digital signal processing (DSP) techniques such as using linear prediction coefficients (LPC) or log-likelihood of a-priori to a-posteriori signal to noise ratios (SNRs) to detect speech. Increasingly, machine learning approaches such as deep neural networks (DNN) are being deployed for voice activity detection. Machine learning approaches may generate better performance than DSP techniques but generally involve higher computational complexity and a larger memory footprint, and thus may be inadequate for deployment on mobile devices. Machine learning techniques trained on a set of training data may also be difficult to tailor to different applications having different active speech detection requirements.

To provide robust and flexible voice activity detection for mobile devices having stringent power and size requirements, a hybrid machine learning-based and DSP statistical post-processing approach is disclosed. The hybrid technique uses a machine learning-based technique such as a DNN model with a small context window to estimate the probability of speech on a frame-by-frame basis. The DSP statistical post-processing stage operates on the frame-based speech probabilities from the DNN model to smooth the probabilities and estimated transitions between speech and non-speech states. The hybrid technique may estimate the soft decision on the presence of speech in each frame based on the smoothed probabilities, generate a hard decision on the frame-based speech using a threshold, detect a complete utterance such as a query or command that may include brief pauses in the utterance, and estimate the end point of the utterance. The outputs from the voice activity detection such as the soft decisions, hard decisions, detected utterances, and estimated endpoints may be used by online ASR to recognize and interpret the utterance.

In one embodiment, the hybrid voice activity detection technique may incorporate a target directional probability estimator to estimate the direction of a target speech source. The DSP statistical post-processing module may use the direction or other location information of the speech source to inform the estimates of the voice activity of a target speaker. For example, hard decisions, detected utterances, and end points of utterances may be estimated based on the estimated direction of the speech source. In one example, when the direction of a main speaker is identified, end pointing may be estimated based on the end of the utterance from the main speaker rather than the end of the utterance from an interfering speaker. Information on the direction of the main speaker may also reduce the probability of declaring false speech activities due to an interfering speaker when estimating the detected utterances or hard decisions. Even when the direction of the main speaker is unknown, changes detected in the direction of the main or interfering speakers may be incorporated into the output from the voice activity detection to improve the ASR.

Advantageously, the hybrid voice activity detection architecture combines a pre-trained DNN model having a small footprint and low complexity with a DSP post processing stage performing flexible statistical post-processing to tailor the detected active speech to different applications. The DNN may be trained on a large corpus to give instantaneous estimates of speech activity. The hybrid architecture may extract features of the active speech for processing by the DNN using a small context window with no look-ahead frames to provide real-time fast response. In one embodiment, to reduce input feature dimension, extracted features for the DNN may include a current frame power spectrum density (PSD) and smoothed statistics of PSDs of previous frames instead of concatenating PSDs of a large number of past and future frames. In one embodiment, filter banks in the DNN model may operate on the frequency-domain or time-frequency domain representation of the captured audio signals to further reduce the input feature dimension such as to reduce the number of spectral elements or frequency bins, or to provide better resolution at low frequencies.

The DSP statistical and post-processing stage may perform tradeoffs between performance parameters of voice activity detection such as onset detection, truncation error, latency, false activities, etc., to flexibly adapt the outputs to suit the requirements of a particular application. In one embodiment, the DSP statistical and post-processing stage may perform statistical smoothing on the frame-based decisions from the DNN model and may tune the statistical smoothing to tailor the single DNN model for different applications. The statistical smoothing may reduce the probability of fast transitions between speech and non-speech states to produce a better tradeoff between false accepts and false rejects of utterances in the presence of reverberation and noise. The statistical smoothing may also adaptively adjust a wait time after detecting a transition from the speech to the non-speech state when performing tradeoffs between truncation of active speech and trailing silence or latency to reduce the probability of false accepts of end points. The hybrid voice activity detection technique may be robust to background noise, reverberation from far-field speech, changes in the sampling rate (e.g., from 16 KHz to 8 KHz) of audio signals, changes in the speech level, differences in the characteristics and form factor of microphones, etc. In one embodiment, incorporating location or directional information of a main speaker with the hybrid voice activity detection architecture improves the estimates of active speech in the presence of an interfering speaker.

A method for voice activity detection from a target speaker by a device is disclosed. The method includes receiving an audio signal produced by a microphone of the device. The audio signal is captured from sound of the target speaker. The audio signal is divided into a number of frames. The method also includes determining signal characteristics or features from each frame of the audio signal and determining a statistical measure of signal characteristics or features of a context window for each frame of the audio signal. The method further includes estimating, using a deep learning system such as DNN, the probability that speech is detected in each frame based on the signal characteristics or features from each frame and the statistical measure of the signal characteristics or features of the context window for each frame. The method further includes estimating, by a statistical DSP post-processing stage, the voice activity of the target speaker based on the probability of detected speech in each frame. In one embodiment, the method includes a rule to combine the frame-based probability estimates of speech from the DNN with the probability estimates that the speech is coming from a target direction of the target speaker.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 1 depicts a scenario of a user issuing a voice command to a smartphone for the smartphone to detect the voice command according to one embodiment of the disclosure.

DETAILED DESCRIPTION

Figure 2:
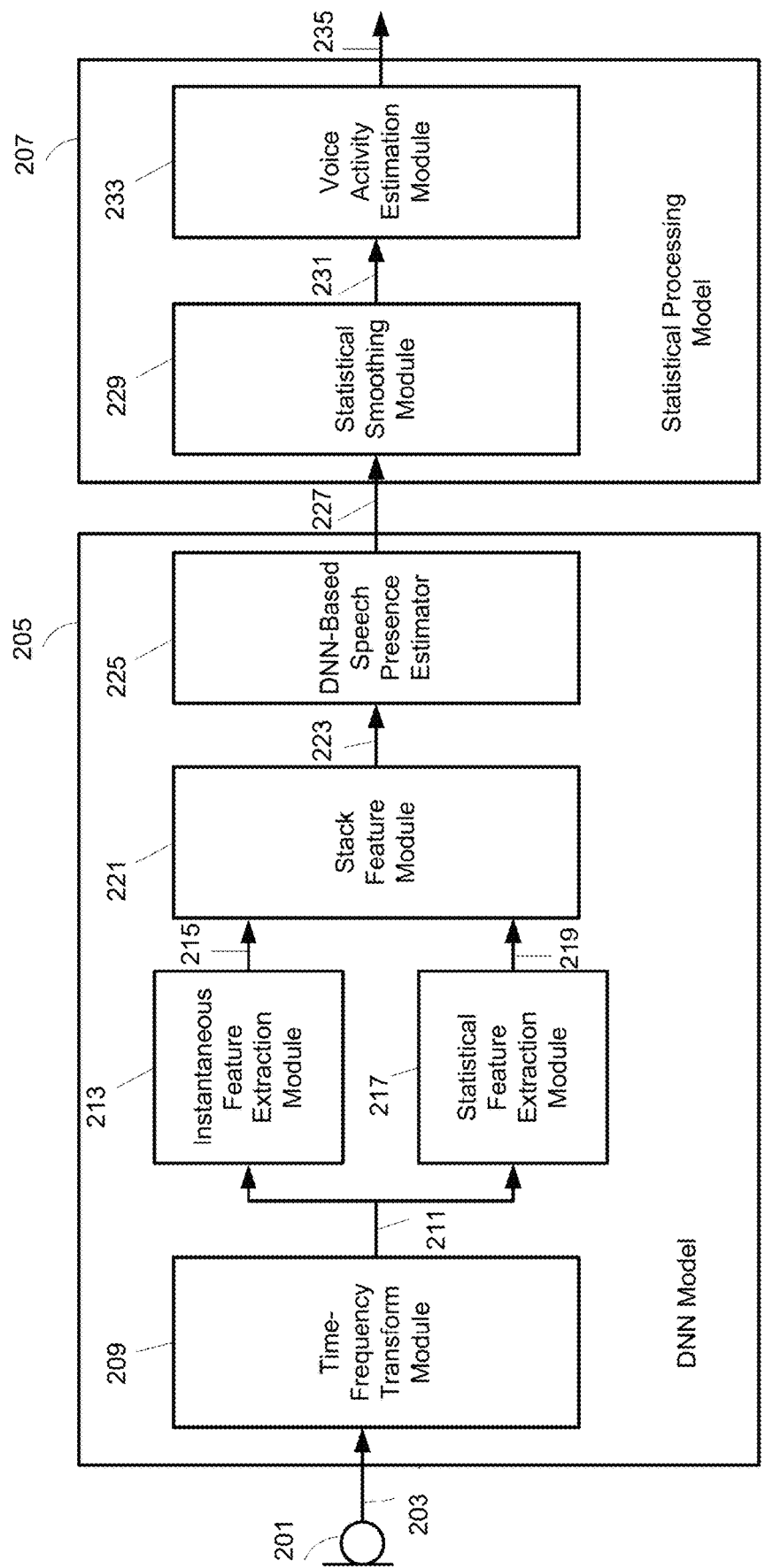
FIG. 2 is a block diagram of a hybrid voice activity detection architecture combining a machine learning-based model and a DSP statistical post-processing stage according to one embodiment of the disclosure.

It is often desirable for voice activated devices to detect active speech such as for smartphones to detect voice commands or virtual assistants to detect user queries. In one application, a device may process audio signals captured by one or more microphones of the device to estimate the start and end of speech to aid automatic speech recognition (ASR) software to respond to a command or query. In another application, a video conferencing application may detect the speech of a conference participant and the prominence level of the speech to route the detected speech to other participants. Robust detection of active speech from a target or main speaker in the presence of noise and interference from competing speakers enables the device or applications running on the device or online to respond accurately and promptly to the target speaker.

Systems and methods are disclosed for a hybrid voice activity detection architecture that combines a machine learning-based technique such as a DNN model with a statistical DSP post-processing stage. The hybrid architecture allows a single pre-trained DNN model that operates on a compact context window of extracted features to generate frame-based probabilities of speech. The statistical DSP post-processing stage processes the decision output from the DNN model to tailor the detected speech for different applications. The outputs from the statistical DSP post-processing stage may include soft decisions of frame-based speech, hard decisions of frame-based speech determined by applying a threshold to the soft decisions, end pointing of utterances, detection of an utterance that includes the starting point and the end point of the utterance, or combinations thereof.

The compact context window of features for the DNN model may include features extracted from a current frame and statistics of features extracted from a number of previous frames to reduce the input feature dimension. Frame-based audio signals may be represented in the frequency domain and filter banks may operate on the frequency domain samples to reduce the number of spectral elements. The smaller number of spectral elements and the features statistically generated from the spectral elements for past frames reduce the memory footprint and the computational complexity of the DNN model compared to a DNN model that operates on a concatenation of a large number of past and look-ahead frames.

The statistical DSP post-processing stage may perform statistical smoothing of the frame-based probabilities of speech from the DNN model to fill in silence gaps or to filter out noisy decisions or fast transitions between estimated states of speech and no speech. Once a transition from speech to non-speech is detected, a wait time expressed as a programmable number of frames may be triggered to wait for a period of trailing silence to expire before declaring an end point. The wait time reduces the probability of false accepts in end pointing when a brief pause in the utterance may be mistakenly interpreted as the end point of the utterance. The wait time for the end pointing, parameters used to filter the noisy decisions from the DNN model and to smooth the state transitions, and parameters used to generate the outputs from the statistical DSP post-processing stage, such as the threshold for the hard decisions, may be adaptively adjusted based on the characteristics of the detected speech signals.

In one embodiment, the hybrid voice activity detection architecture may be combined with a target directional probability estimator to enhance the estimates of active speech. The target directional probability estimator may operate on multichannel audio signals captured by a microphone array to estimate the direction of a target speaker. In one embodiment, the target directional probability estimator may use a camera to distinguish the target speaker from an interfering speaker. The hybrid voice activity detection architecture may combine the estimated direction of the target speaker with the decisions of the DNN model to improve the ability of the statistical DSP post-processing stage to correctly detect the utterance from the target speaker when there is an interfering speaker.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 depicts a scenario of a user issuing a voice command to a smartphone for the smartphone to detect the voice command according to one embodiment of the disclosure. The smartphone 101 may include three microphones 102, 103, and 104 located at various locations on the smartphone 101. The microphones 102, 103, and 104 may form a compact microphone array to capture speech signals from the user 110. As an example, the user 110 may utter a query keyword such as "Hey Siri" followed by the query "What time is it?" to request the current time from a smart assistant application. The smartphone 101 may divide the speech signals captured by one of the microphones into frames and may transmit the audio data frames to a hybrid voice activity detection system running on the smartphone 101.

A pre-trained DNN model of the hybrid voice activity detection system may operate on features extracted from a current frame and features statistically extracted from a number of previous frames into a smaller feature size to make inferences about the presence of speech in the current frame. The DNN model may estimate a probability of the presence of speech in each frame. A statistical DSP post-processing stage may smooth the frame-based probability estimates to fill in silence gaps and filter out noisy decisions to generate a statistically smoothed probability or soft decisions of the presence of speech in each frame. The soft decisions may be compared against a threshold to generate binary hard decisions representing speech or no speech. The statistical DSP post-processing stage may estimate the end point of an utterance after the expiration of an interval of trailing silence following the detection of the hard decision transitioning from speech to no speech. Based on the end point and an estimated starting point of an utterance, the statistical DSP post-processing stage may generate an utterance decision for the ASR.

FIG. 2 is a block diagram of a hybrid voice activity detection architecture combining a machine learning-based model and a DSP statistical post-processing stage according to one embodiment of the disclosure. The hybrid architecture includes a pre-trained DNN model 205 to estimate the presence of active speech and a statistical processing model 207 that post-processes the estimates from the DNN model 205 to generate voice activity detection outputs for different applications. The statistical processing model 207 may perform tradeoffs between performance parameters of voice activity detection such as onset detection, truncation error, latency, false activities, etc., to flexibly adapt the voice activity detection outputs to suit the requirements of a particular application.

A microphone 201 may capture the speech signal from a speaker to generate a channel of audio signal 203. The audio signal 203 may be divided into blocks or frames of time-domain samples. In one embodiment, a frame may be a few milliseconds (ms), such as 10 ms. A time-frequency transform module 209 operates on each frame of audio signal 203 to transform the time-domain samples into a frequency-domain or a time-frequency domain representation. The time-frequency transform module 209 may perform windowed short-time Fourier transform, Gabor transform, wavelet transform or other types of multi-resolution analysis. The frequency-domain or time-frequency domain representation of the audio signal 203 may be in fixed time and frequency resolution or in variable time and frequency resolution across a range of frequency bins and time resolution. Mel-weighted or gamma tone filter bank may operate on the frequency-domain or time-frequency domain samples to reduce the number of spectral elements or frequency bins, or to provide better resolution at low frequencies, etc. The smaller number of spectral elements reduces the memory footprint and the computational complexity of the DNN model 205.

An instantaneous feature extraction module 213 extracts features or characteristics of the spectral information of a current frame of the output 211 generated by the time-frequency transform module 209. In one embodiment, the extracted features may be based on the power spectrum density (PSD) of the current frame. The extracted features 215 of the current frame along with feature extracted from frames in the context window surrounding the current frame may be used to estimate the presence of active speech in the current frame.

To reduce the feature dimension of the context window, a statistical feature extraction module 217 may process the spectral information of a number of frames in the context window surrounding the current frame to generate a statistical measure 219 of the features in the context window. In one embodiment, the context window may encompass a number of frames, for example 5 frames, preceding the current frame and the statistical measure 219 of the features in the context window may be based on the smoothed statistics of the PSDs of the frames in the context window, such as an average or other statistical moments of the PSDs of the 5 frames preceding the current frame. In one embodiment, the statistical feature extraction module 217 may apply a programmable time constant to the PSDs of the previous frames in the context window to derive the statistical measure 219. The time constant may be determined through a tradeoff between fast detection of speech onsets or speech offsets and robustness of speech detection in stationary noise. In one embodiment, a multi-resolution approach that uses both fast and slow time constants may be used to track both fast and slow changing features. In one embodiment, the context window may include the current frame. By using a statistical measure of the spectral content in the context window such as the smoothed PSDs instead of concatenating past and future frames to reduce input feature dimension, the DNN model 205 may achieve real-time fast response while reducing memory footprint and computational complexity. In one embodiment, in an offline voice activity detection application, e.g., when real-time processing is not critical, a larger context window including future frames may be used to extract features (look-ahead features). In one embodiment, the statistical feature extraction module 217 may compute a logarithm of the spectral content or a logarithm of the statistical measure of the spectral content to increase the dynamic range or stability of the DNN model 205.

A stack feature module 221 concatenates the extracted features 215 of the current frame with the statistical measure 219 of the features extracted from the frames of the context window of the current frame. For example, the stack feature module 221 may concatenate into a vector the features based on the PSD of the current frame and the features based on the average PSDs of the frames in the context window to model the temporal dynamics of the PSDs.

A pre-trained DNN-based speech presence estimator 225 processes the concatenated features 223 extracted from the current frame and statistically measured from the frames of the context window to estimate the probability of the presence of speech in the current frame. The DNN may have been trained on a large corpus to give instantaneous estimates of speech activity in the current frame.

Figure 3:
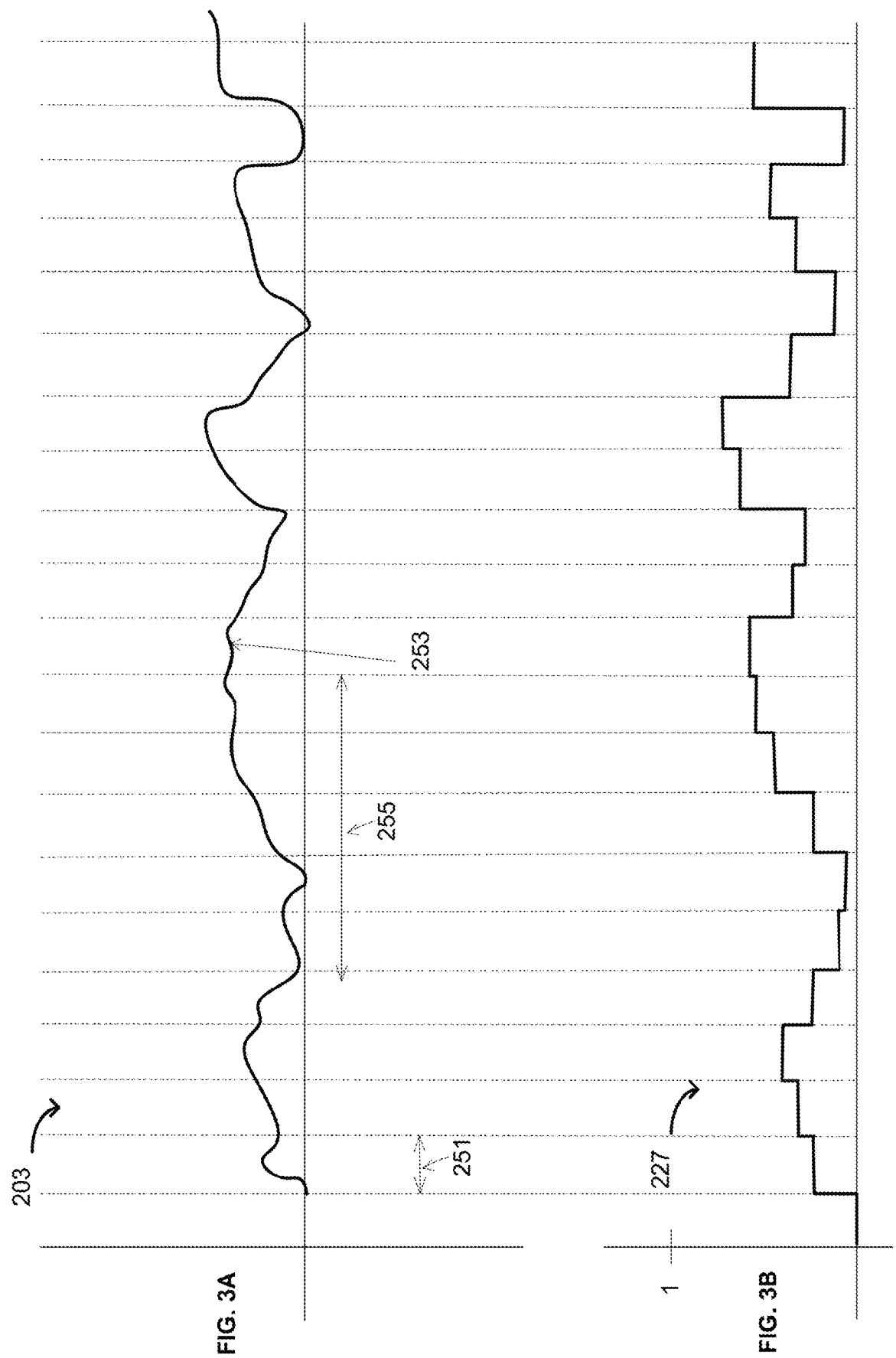
FIG. 3A-3B are timing diagrams of the audio signals of a voice command captured by a microphone of a smartphone and the estimated probabilities of frame-based speech activity produced by the machine learning-based model of the hybrid voice activity architecture accordance to one embodiment of the disclosure.

In one embodiment, the DNN-based speech presence estimator 225 has a feed-forward architecture. In one embodiment, the feed-forward architecture may be a factorized architecture. In one embodiment, the DNN architecture may be a recurrent neural network (RNN) that uses gated recurrent unit (GRU) or long short-term memory (LSTM) to take into account the temporal structure of the sequential frames of speech signals. In one embodiment, the DNN architecture may be a combination of feed-forward architecture, RNN, a convolutional neural network, or any other suitable deep learning network. In one embodiment, the DNN architecture may be a complex-valued DNN (CV-DNN) to handle complex time-frequency domain representations. The output 227 from the DNN-based speech presence estimator 225 may provide regression features that provide a continuous frame-based probability of the presence of speech in each frame of audio signals. In one embodiment, the cost function may be mean squared error or mean absolute error. In one embodiment, the cost function may be normalized mean squared error or normalized mean absolute error for regression features with emphasis on relative accuracy FIG. 3A-3B are timing diagrams of the audio signals of a voice command captured by a microphone of a smartphone and the estimated probabilities of frame-based speech activity produced by the machine learning-based model of the hybrid voice activity architecture accordance to one embodiment of the disclosure. The machine learning-based model may be the DNN model 205 of FIG. 2.

FIG. 3A shows the audio signal 203 captured by the microphone 201 broken into frames. Each frame 251 may be a few ms long. The audio signal 203 may represent a query from a speaker, such as a virtual assistant query "Hey Ski, what time is it?" The query may have several brief pauses or silence gaps interspersed among periods of active speech. To estimate the probability of speech in a current frame of interest 253, the DNN model 205 may make inferences about the probability based on features extracted from the current frame 253 and a statistical measure of the features in a context window 255 of five frames preceding the current frame 253. For example, the DNN model 205 may process the PSD of the current frame 253 and smoothed statistics of the PSDs of the five frames of the context window 255 to estimate the probability of speech in the current frame 253.

FIG. 3B shows the frame-based probability estimates 227 of the presence of speech in each frame of the query from the output of the DNN model 205. The current frame 253 may have a high probability of speech compared to other frames based on a high level of PSD in the current frame 253 and a high level of smoothed PSDs of the context window 255. Due to the few brief pauses of speech in the query, the frame-based probability estimates 227 may not clearly indicate the end point of the query. A statistical DSP post-processing stage may smooth the frame-based probability estimates to fill in silence gaps and filter out noisy decisions to generate a statistically smoothed probability or a soft decision of the presence of speech in each frame.

Referring back to FIG. 2, a statistical smoothing module 229 of the statistical processing model 207 may perform statistical smoothing on the frame-based probability estimates 227 and may tune the statistical smoothing to tailor the output from the DNN model 205 for different applications. The statistical smoothing may reduce the probability of fast transitions between speech and non-speech states to produce a better tradeoff between false accepts and false rejects of active speech in the presence of reverberation, noise, and silence gaps. In one embodiment, the statistical smoothing may use a hidden Markov model (HMM) to decide between states of speech and non-speech based on the frame-based probability estimates 227. The HMM smoothing may penalize transitions from speech to non-speech and from non-speech to speech using smoothing parameters such as HMM transition probabilities. By using probability estimates 227 instead of log likelihood ratio, the HMM smoothing may implement a closed-form solution. Fast transitions between speech and non-speech due to silence gaps or noisy decisions may be filtered to reduce the probability of false rejects of active speech.

In one embodiment, the statistical smoothing module 229 may wait for a time interval after detecting a transition from speech to non-speech before declaring an end point of the utterance to reduce the probability of falsely interpreting a brief pause in the utterance as an end point of the utterance. For example, the wait time may be set by a counter that is triggered when the HMM detects a transition from speech to non-speech. The counter may count down as long as the state remains in non-speech. When the counter expires, the frame in which the transition from speech to non-speech was detected may be declared as the end point of the utterance. If the state transitions from non-speech to speech before the counter expires, the non-speech segment may be deemed a brief pause so that the utterance is not truncated. The statistical smoothing module 229 may determine the wait time when performing tradeoffs between the probability of truncation of active speech and the trailing silence or latency for end pointing performance.

In one embodiment, the statistical smoothing module 229 may adaptively adjust the wait time for end pointing based on the speed in which speech is uttered and any impairment of the speech. For example, the statistical smoothing module 229 may average the length of silence gaps based on previous non-speech segments or may estimate the SNR of the speech in the frames. The statistical smoothing module 229 may adaptively adjust the wait time based on the average silence gap length or the estimated SNR in the frame-based probability estimates 227 or in the statistically smoothed probabilities 231 for a more robust end pointing. In one embodiment, the smoothing parameters such as the transition probabilities for the HMM smoothing may also be adaptively adjusted based on the estimated SNR. As such, the DNN-based speech presence estimator 225 may be trained for general purpose application and then adaptively tuned in real time using statistical smoothing to tailor the output for different applications.

A voice activity estimation module 233 of the statistical processing model 207 may estimate the soft decision on the presence of speech in each frame based on the statistically smoothed probabilities 231 from the statistical smoothing module 229. In one embodiment, a soft decision between [0 1] may be generated using ideal ratio masks (IRM). The soft decision may be compared against a threshold to generate a binary hard decision. In one embodiment, the voice activity estimation module 233 may adaptively adjust the hard decision threshold based on the estimated SNR to adjust statistics of the hard decisions based on the noise level. In one embodiment, the voice activity estimation module 233 may generate separate soft and hard decisions for different frequency bands of the frequency-domain representation. In one embodiment, an onset point of an utterance may be determined based on the hard decisions and an end point of the utterance may be determined based on the hard decisions and the end pointing wait time. The voice activity estimation module 233 may treat the speech between the onset and the end point as a complete utterance that may include brief pauses in the utterance shorter than the end pointing wait time. The statistical processing model 207 may output the frame-based soft decisions, frame-based hard decisions, the end points of utterances, and complete utterances on the output 235 for ASR software to recognize and interpret the utterance.

FIG. 4A-4D are timing diagrams of the frame-based speech activity from the machine learning-based model and the outputs from the DSP statistical post-processing stage in accordance to one embodiment of the disclosure. The machine learning-based model may be the DNN model 205 and the DSP statistical post-processing stage may be the statistical processing model 207 of FIG. 2.

Figure 4:
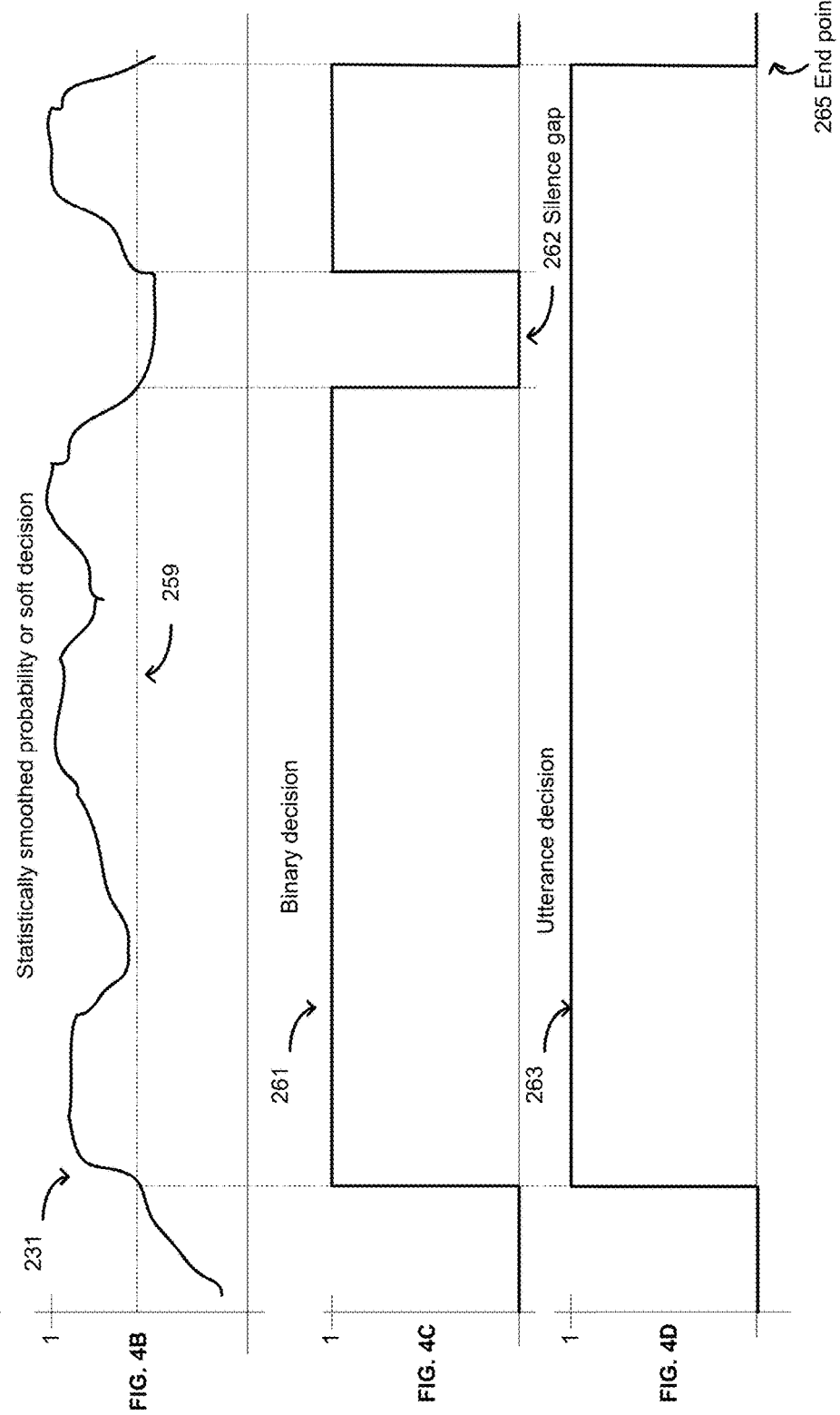
FIG. 4A-4D are timing diagrams of the frame-based speech activity from the machine learning-based model and the outputs from the DSP statistical post-processing stage in accordance to one embodiment of the disclosure.

FIG. 4A shows the frame-based probability estimates 227 of an utterance from the output of the DNN model 205. The frame-based probability estimates 227 may have noisy estimates and silence gaps. The statistical DSP post-processing stage may smooth the frame-based probability estimates 227 to fill in silence gaps and filter out noisy decisions to generate statistically smoothed probabilities.

FIG. 4B shows the statistically smoothed probabilities 231 of the utterance generated by the statistical smoothing module 229. Compared to the probabilities 227 before smoothing, the brief silence gaps are not as pronounced and the intervals of silence gaps are shorter in the smoothed probabilities 231. The smoothed probabilities 231 may be the soft decision outputs. The statistical DSP post-processing stage may compare the soft decisions against a hard decision threshold 259 to generate binary hard decisions. In one embodiment, the smoothing parameters for the smoothing and the hard decision threshold may be adaptively adjusted based the characteristics of the utterance, such as SNR.

FIG. 4C shows the binary hard decisions 261 of the utterance. The onset of the utterance may correspond to the frame when the hard decision transitions from 0 to 1. A silence gap 262 representing a brief pause in the utterance appears in the hard decisions. The silence gap 262 may be shorter than the end pointing wait time so that the transition of the hard decision from 1 to 0 at the beginning of the silence gap 262 is not estimated to be the end point of the utterance. To find the end point of the utterance, the statistical DSP post-processing stage may detect when the hard decision transitions from 1 to 0 and stays at 0 for a longer duration than the end pointing wait time.

FIG. 4D shows the utterance decision 263 after the statistical DSP post-processing stage detects the end point 265. The statistical DSP post-processing stage may output the utterance decision 263 and the audio signal of the utterance to the ASR software to allow the ASR software to treat the audio signal enveloped by the utterance decision 263 as a complete utterance.

Figure 5:
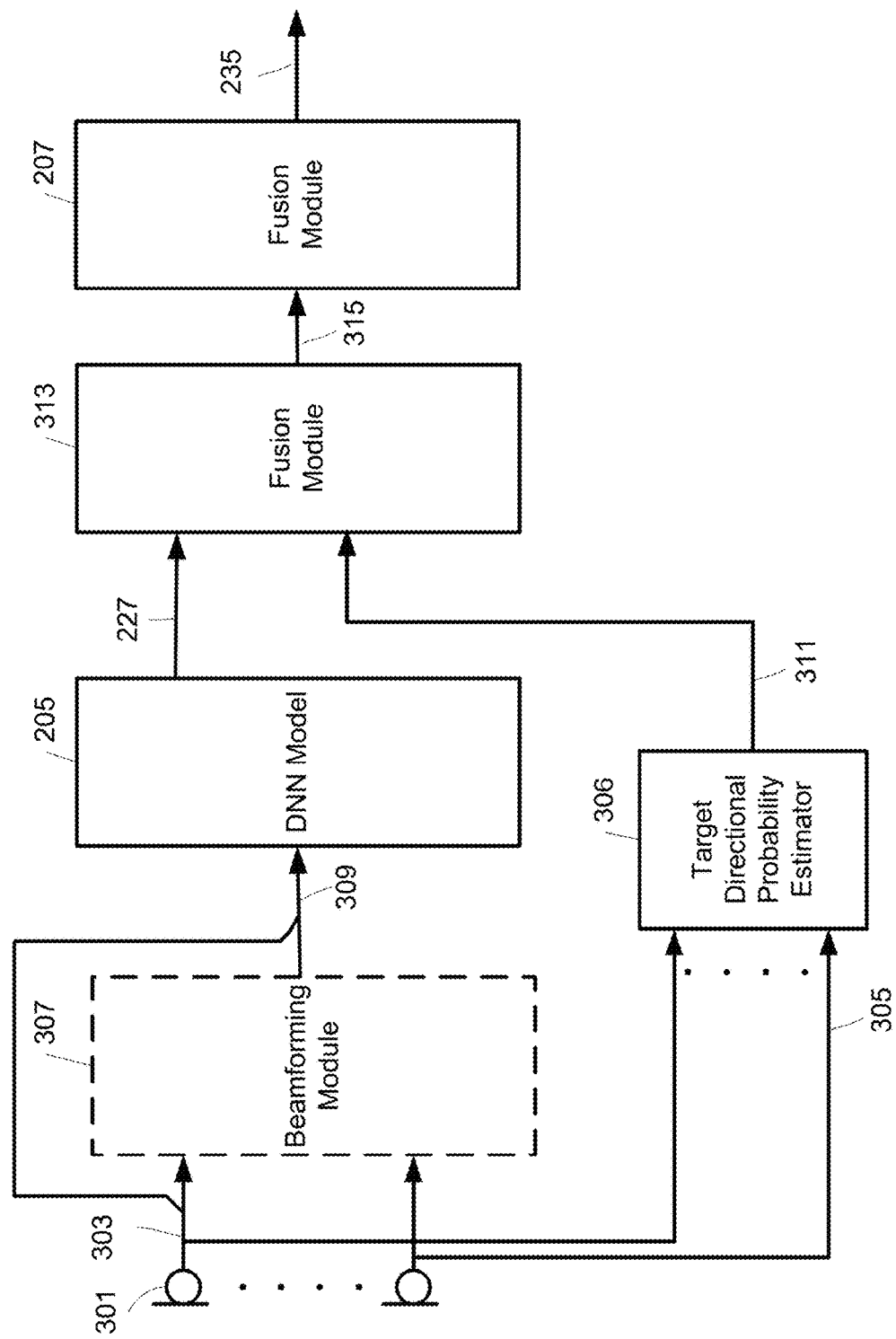
FIG. 5 is a block diagram of a hybrid voice activity detection architecture that estimates the target speech directional probability to inform the outputs from the DSP statistical post-processing stage in accordance to one embodiment of the disclosure.

FIG. 5 is a block diagram of a hybrid voice activity detection architecture that estimates the target speech directional probability to inform the outputs from the DSP statistical post-processing stage in accordance to one embodiment of the disclosure. A microphone array 301, such as the microphones 102, 103, and 104 of the smartphone 101 of FIG. 1 may capture the speech to generate a multichannel audio signal 305. A target directional probability estimator 306 may operate on the multichannel audio signal 305 to estimate the direction of a target speaker. In one embodiment, the target directional probability estimator 306 may operate on a beamformed audio signal from the microphone array 301 that has directional sensitivity. In one embodiment, the target directional probability estimator 306 may operate on video signals captured by a camera to identify the direction and location of a target speaker. Using the video signals to visually identify speakers allows identification of the speech as coming from the target speaker or an interfering speaker even if the two speakers are at the same direction from the microphone array 301. Once the direction of a target speaker is identified, the target directional probability estimator 306 may operate on the audio signal 305 to estimate the probability that the speech at a particular time instant is coming from the direction of the target speaker and thus is spoken by the target speaker.

The DNN model 205 may operate on one channel 303 of the multichannel audio signal 305 to estimate the probability of the presence of speech in the current frame. In one embodiment, the DNN model 205 may operate on a beamformed signal 309 that has directional sensitivity. For example, a beamforming module 307 may process the multichannel audio signal 305 to generate the beamformed signal 309 whose power level is a function of the direction of arrival of the speech captured by the microphone array 301. For example, the beamforming module 307 may map the direction of arrival to a probability of active voice from a target speaker by assuming a given direction of arrival from the target speaker or tracking a sudden change in the direction of arrival. The operation of the DNN model 205 has been discussed in FIG. 2 and will not be repeated for brevity.

A fusion module 313 may combine the frame-based probability estimates 227 of the presence of speech generated by the DNN model 205 with the probability estimates 311 that the speech is coming from the direction of the target speaker generated by the target directional probability estimator 306. In one embodiment, the fusion module 313 may attenuate the frame-based probability estimates 227 if the speech giving rise to the estimates are associated with a low probability of having arrived from the direction of the target speaker as indicated by the target directional probability estimates 311. In one embodiment, the fusion module 313 may associate the frame-based probability estimates 227 with the target directional probability estimates 311.

The statistical processing model 207 may operate on the output 315 of the fusion module to improve the ability of the statistical processing model 207 to correctly detect voice activity from the target speaker when there is an interfering speaker. For example, end pointing may be improved based on end pointing at the end of the utterance from the main speaker rather than end pointing at the end of the utterance from an interfering speaker because the end pointing wait time counter may not be triggered if the transition from speech to non-speech is associated with a low probability of having arrived from the direction of the target speaker as indicated by the target directional probability estimates. Target directional information may also reduce the probability of detecting false speech activities due to an interfering speaker when estimating the detected utterances or hard decisions of the utterances. Even when the direction of the main speaker has not been identified, changes detected in the direction of the main or interfering speakers may be incorporated with the output from the statistical processing model 207 to improve the ASR process.

Figure 6:
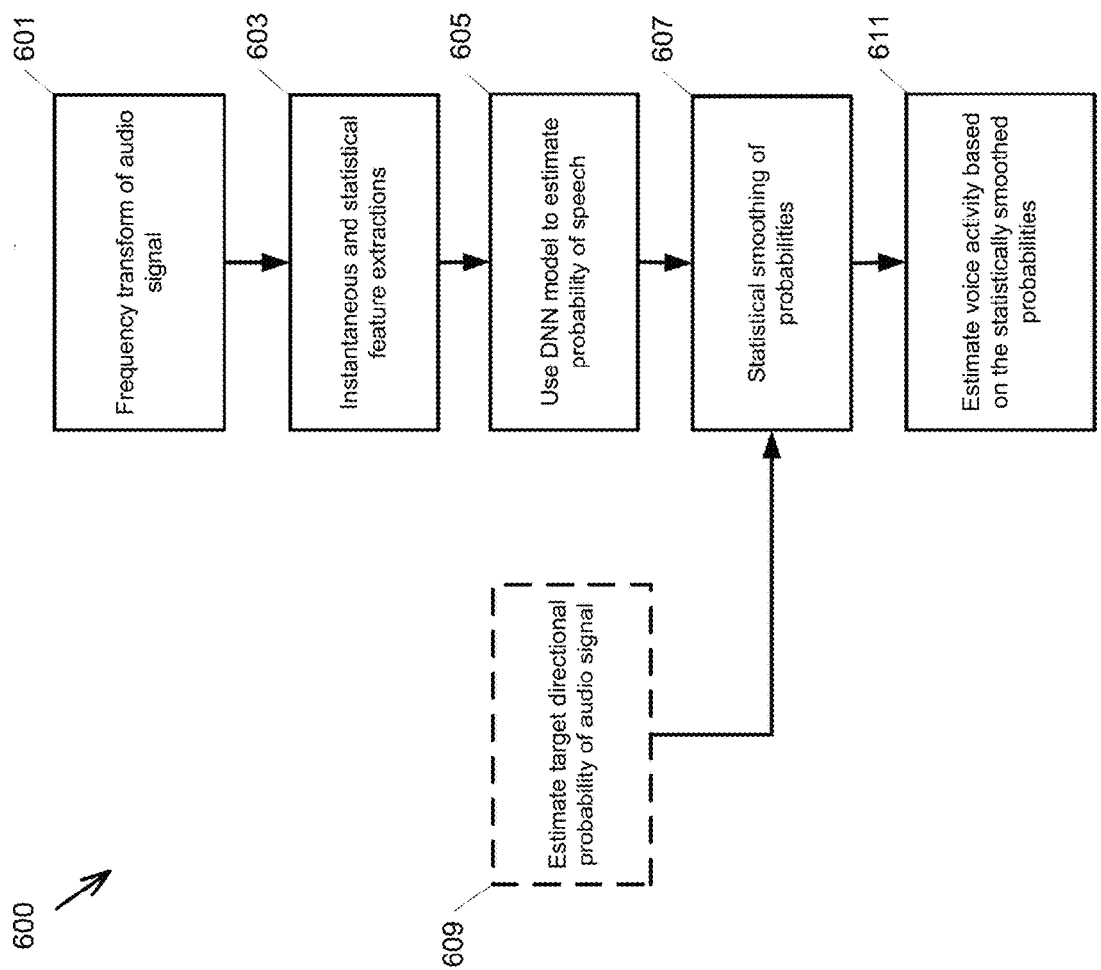
FIG. 6 is a flow diagram of a method of estimating active speech using a hybrid voice activity detection architecture combining a machine learning-based model and a DSP statistical post-processing stage in accordance to one embodiment of the disclosure.

FIG. 6 is a flow diagram of a method 600 of estimating active speech using a hybrid voice activity detection architecture combining a machine learning-based model and a DSP statistical post-processing stage in accordance to one embodiment of the disclosure. The method 600 may be practiced by the hybrid voice activity detection architecture of FIG. 2 on a device such as a smartphone.

In operation 601, the method 600 transforms a time-domain audio signal captured by a microphone of the device into a frequency-domain representation. The time-domain audio signal may be divided into frames and the method may transform each frame of time-domain audio signal into the frequency-domain representation. The audio signal may then be represented as a time sequence of frequency-domain samples.

In operation 603, the method 600 extracts features of successive current frames of the time sequence of frequency-domain samples and generates a statistical measure of the features extracted from a number of frames in a context window with respect to each of the successive current frames. In one embodiment, the statistical measure of the features in the frames of the context window may be a time average of the features. The frames of the context window may precede a current frame in time and the statistical measure may be based on the smoothed statistics of the features, such as PSDs. Using the statistical measures of the features of the context window rather than using the raw features of the context window reduces the feature dimension to achieve real-time voice activity detection while reducing memory footprint and computational complexity.

In operation 605, the method 600 uses a deep learning system, such as a DNN, to estimate the probability of the presence of speech in the successive current frames based on the extracted features of the current frame and the statistical measure of the extracted features of the frames in the context window of the current frame. The DNN may be a feed-forward neural network, deep recursive neural network, convolutional neural network, etc.

In operation 607, the method 600 performs statistical smoothing on the frame-based probability estimates from the deep learning system. The statistical smoothing fills in silence gaps and filters out noisy probability estimates to generate a statistically smoothed probability of the presence of speech in each frame. For example, the statistical smoothing may reduce the probability of fast transitions between speech and non-speech to reduce the probability of false rejects of active speech. The statistical smoothing may also wait for a time interval after detecting a transition from speech to non-speech before declaring an end point of the utterance to reduce the probability of falsely interpreting a brief pause in the utterance as an end point of the utterance.

In operation 609, the method 600 optionally estimates the target directional probability of the time-domain audio signal to inform the statistical smoothing of the frame-based probability estimates. The target directional probability may estimate the probability that the audio signal is coming from the direction of a target speaker and thus is spoken by the target speaker rather than an interfering speaker. The target directional probability may be based on multichannel audio signal captured a microphone array. Using the target directional probability to inform the statistical smoothing of the frame-based probability estimates may reduce the probability of end pointing at the end of the utterance from an interfering speaker or detecting false speech activities due to the interfering speaker.

In operation 611, the method 600 estimates voice activity based on the statistically smoothed probabilities. The voice activity outputs may include soft decisions on the presence of speech in each frame, binary hard decisions generated by comparing the soft decisions against a threshold, estimated end point of an utterance, detection of an utterance that includes the starting point and the end point, etc. The utterance may include brief pauses that are shorter than end pointing wait time. The voice activity outputs may be provided to aid the ASR software to recognize and interpret the utterance.

Embodiments of the deep learning system described herein may be implemented in a data processing system, for example, by a network computer, network server, tablet computer, smartphone, laptop computer, desktop computer, other consumer electronic devices or other data processing systems. In particular, the operations described for the deep learning system are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A method of detecting voice activity from a target speaker by a device, the method comprising:
   receiving an audio signal, produced by one or more microphones of the device, that is responsive to sound from the target speaker, the audio signal being divided into a plurality of frames;
   determining, by the device, signal characteristics of each of the plurality of frames and a statistical measure of signal characteristics of a respective context window of each of the plurality of frames;
   estimating, by a machine learning system of the device, a probability of detected speech in each of the plurality of frames based on the signal characteristics of the respective frames and the statistical measure of signal characteristics of the context window of the respective frames;
   estimating, by the device, the voice activity of the target speaker based on the probability of detected speech in each of the plurality of frames estimated by the machine learning system to reduce a probability of false rejects of active speech; and
   transmitting, by the device, parameters associated with the audio signal to a speech recognition system when the voice activity of the target speaker is estimated to include detected speech and one or more brief pauses below a threshold interval.

2. The method of claim 1, wherein the determining, by the device, signal characteristics of each of the plurality of frames and a statistical measure of signal characteristics of a respective context window of each of the plurality of frames comprises transforming the audio signal in each of the plurality of frames into frequency-domain samples.

3. The method of claim 2, wherein the determining, by the device, signal characteristics of each of the plurality of frames and a statistical measure of signal characteristics of a respective context window of each of the plurality of frames further comprises determining a power spectral density (PSD) of each of the plurality of frames and an average PSD of one or more frames within the respective context window of each of the plurality of frames.

4. The method of claim 1, wherein the context window of each of the plurality of frames comprises one or more frames before each of the plurality of frames.

5. The method of claim 1, wherein the estimating, by the device, the voice activity of the target speaker based on the probability of detected speech in each of the plurality of frames comprises:
   statistically smoothing the probability of detected speech in each of the plurality of frames to generate statistically smoothed probability of detected speech in each of the plurality of frames; and
   estimating the voice activity of the target speaker based on the statistically smoothed probability of detected speech in each of the plurality of frames.

6. The method of claim 5, wherein the statistically smoothing the probability of detected speech in each of the plurality of frames comprises reducing transitions between successive frames classified as speech and non-speech in the plurality of frames.

7. The method of claim 6, wherein the statistically smoothing the probability of detected speech in each of the plurality of frames further comprises:
   detecting a transition from speech to non-speech in successive frames of the plurality of frames;
   waiting a delay interval that includes a plurality of successive frames classified as non-speech; and
   declaring an end point of an utterance as the detected transition from speech to non-speech.

8. The method of claim 7, wherein the statistically smoothing the probability of detected speech in each of the plurality of frames further comprises:
   adjusting the delay interval based on characteristics of successive frames classified as non-speech in one or more utterances from the target speaker.

9. The method of claim 1, wherein the parameters associated with the audio signal comprise one or more of a soft decision of detected speech in each of the plurality of frames, a binary hard decision of detected speech in each of the plurality of frames, an end point of an utterance, or a complete utterance of the target speaker.

10. The method of claim 1, further comprising:
    estimating a target directional probability that the audio signal is received from a direction of the target speaker for each of the plurality of frames,
    and wherein the estimating, by the device, the voice activity of the target speaker based on the probability of detected speech in each of the plurality of frames comprises processing the target directional probability to reduce a probability of falsely detecting voice activity of an interfering speaker as the voice activity of the target speaker.

11. A system configured to detect voice activity from a target speaker to a device, the system comprising:

a processor; and a memory coupled to the processor to store instructions, which when executed by the processor, cause the processor to:
- receive an audio signal, produced by one or more microphones of the device, that is responsive to sound from the target speaker, the audio signal being divided into a plurality of frames;
- determine signal characteristics of each of the plurality of frames and a statistical measure of signal characteristics of a respective context window of each of the plurality of frames;
- estimate, based on a learned mapping, a probability of detected speech in each of the plurality of frames based on the signal characteristics of the respective frames and the statistical measure of signal characteristics of the context window of the respective frames; and
- estimate the voice activity of the target speaker based on the probability of detected speech in each of the plurality of frames estimated by the learned mapping to reduce a probability of false rejects of active speech; and
- transmit parameters associated with the audio signal to a speech recognition system when the voice activity of the target speaker is estimated to include detected speech and one or more brief pauses below a threshold interval.

12. The system of claim 11, wherein to determine signal characteristics of each of the plurality of frames and a statistical measure of signal characteristics of a respective context window of each of the plurality of frames, the processor further executes the instructions stored in the memory to transform the audio signal in each of the plurality of frames into frequency-domain samples.

13. The system of claim 12, wherein to determine signal characteristics of each of the plurality of frames and a statistical measure of signal characteristics of a respective context window of each of the plurality of frames, the processor further executes the instructions stored in the memory to determine a power spectral density (PSD) of each of the plurality of frames and an average PSD of one or more frames within the respective context window of each of the plurality of frames.

14. The system of claim 11, wherein to estimate the voice activity of the target speaker based on the probability of detected speech in each of the plurality of frames, the processor further executes the instructions stored in the memory to:
- statistically smooth the probability of detected speech in each of the plurality of frames to generate statistically smoothed probability of detected speech in each of the plurality of frames; and
- estimate the voice activity of the target speaker based on the statistically smoothed probability of detected speech in each of the plurality of frames.

15. The system of claim 14, wherein to statistically smooth the probability of detected speech in each of the plurality of frames, the processor further executes the instructions stored in the memory to reduce transitions between successive frames classified as speech and non-speech in the plurality of frames.

16. The system of claim 15, wherein to statistically smooth the probability of detected speech in each of the plurality of frames, the processor further executes the instructions stored in the memory to:
- detect a transition from speech to non-speech in successive frames of the plurality of frames;
- wait a delay interval that includes a plurality of successive frames classified as non-speech; and
- declare an end point of an utterance as the detected transition from speech to non-speech.

17. The system of claim 16, wherein to statistically smooth the probability of detected speech in each of the plurality of frames, the processor further executes the instructions stored in the memory to adjust the delay interval based on characteristics of successive frames classified as non-speech in one or more utterances from the target speaker.

18. The system of claim 11, wherein the parameters associated with the audio signal comprise one or more of a soft decision of detected speech in each of the plurality of frames, a binary hard decision of detected speech in each of the plurality of frames, an end point of an utterance, or a complete utterance of the target speaker.

19. The system of claim 11, wherein the processor further executes the instructions stored in the memory to:
- estimate a target directional probability that the audio signal is received from a direction of the target speaker for each of the plurality of frames,
- and wherein to estimate the voice activity of the target speaker based on the probability of detected speech in each of the plurality of frames, the processor further executes the instructions stored in the memory to process the target directional probability to reduce a probability that voice activity of an interfering speaker is falsely detected as the voice activity of the target speaker.

20. A non-transitory computer-readable medium having instructions stored therein, which when executed by a processor, cause the processor to perform operations, the operations comprising:
- receiving an audio signal, produced by one or more microphones of the device, that is responsive to sound from the target speaker, the audio signal being divided into a plurality of frames;
- determining signal characteristics of each of the plurality of frames and a statistical measure of signal characteristics of a respective context window of each of the plurality of frames;
- estimating, based on a learned mapping, a probability of detected speech in each of the plurality of frames based on the signal characteristics of the respective frames and the statistical measure of signal characteristics of the context window of the respective frames; and
- estimating the voice activity of the target speaker based on the probability of detected speech in each of the plurality of frames estimated by the learned mapping to reduce a probability of false rejects of active speech; and
- transmitting parameters associated with the audio signal to a speech recognition system when the voice activity of the target speaker is estimated to include detected speech and one or more brief pauses below a threshold interval.

* * * * *